(12) United States Patent
Ebihara (10) Patent No.: US 7,196,528 B2
(45) Date of Patent: Mar. 27, 2007

(54) ELECTROSTATIC CAPACITANCE DETECTION DEVICE

(75) Inventor: Hiroaki Ebihara, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/213,963

(22) Filed: Aug. 30, 2005

(65) Prior Publication Data

US 2006/0097735 A1  May 11, 2006

(30) Foreign Application Priority Data

Nov. 10, 2004  (JP)  ............................. 2004-326767

(51) Int. Cl.
  *G01R 27/26* (2006.01)
(52) U.S. Cl. ...................... 324/686; 324/678; 324/658
(58) Field of Classification Search ................ 324/600, 324/658–690, 649; 382/124; 257/414
See application file for complete search history.

(56) References Cited

U.S. PATENT DOCUMENTS

| | | | | |
|---|---|---|---|---|
| 4,771,638 | A | * | 9/1988 | Sugiyama et al. ............. 73/721 |
| 6,264,302 | B1 | * | 7/2001 | Imanaka et al. ............... 347/19 |
| 6,518,083 | B2 | * | 2/2003 | Sato et al. ..................... 438/50 |
| 6,657,269 | B2 | * | 12/2003 | Migliorato et al. .......... 257/414 |
| 6,844,744 | B2 | * | 1/2005 | Ishii et al. ................... 324/686 |
| 7,015,705 | B2 | * | 3/2006 | Inaba et al. .................. 324/678 |
| 7,019,529 | B2 | * | 3/2006 | Walker et al. ............... 324/452 |
| 7,053,633 | B2 | * | 5/2006 | Hara ............................ 324/686 |
| 7,075,316 | B2 | * | 7/2006 | Umeda et al. ............... 324/658 |
| 2003/0222659 | A1 | * | 12/2003 | Miyasaka ................... 324/661 |
| 2004/0103937 | A1 | * | 6/2004 | Bilyalov et al. ............. 136/255 |
| 2004/0239342 | A1 | * | 12/2004 | Yoshida ...................... 324/663 |
| 2004/0247163 | A1 | * | 12/2004 | Hara ........................... 382/124 |
| 2005/0062485 | A1 | * | 3/2005 | Hara ........................... 324/661 |
| 2005/0077911 | A1 | * | 4/2005 | Miyasaka ................... 324/662 |
| 2005/0078856 | A1 | * | 4/2005 | Miyasaka et al. ........... 382/124 |

FOREIGN PATENT DOCUMENTS

| | | |
|---|---|---|
| JP | A 2003-254706 | 9/2003 |
| JP | A 2004-317353 | 11/2004 |
| JP | A 2005-049194 | 2/2005 |
| JP | A 2005-061878 | 3/2005 |
| JP | A 2005-069869 | 3/2005 |

* cited by examiner

*Primary Examiner*—Andrew H. Hirshfeld
*Assistant Examiner*—Hoai-An D. Nguyen
(74) *Attorney, Agent, or Firm*—Oliff & Berridge, PLC (57) ABSTRACT

An electrostatic capacitance detection device including an electrostatic capacitance detection element arranged in a matrix form; a row line arranged in each row for selecting a relevant electrostatic capacitance detection element arranged in a relevant row; an output line arranged in each column for outputting a signal from a relevant electrostatic capacitance detection element arranged in a relevant column, wherein each electrostatic capacitance detection element is provided with a row selection element that controls the outputting of the signal of the relevant electrostatic capacitance detection element to the relevant output line based on the signal from the relevant row, and the signal from the relevant electrostatic capacitance detection element, which is caused to be in a selection state based on the signal from the relevant row line, is outputted to the output line arranged in the relevant electrostatic capacitance detection element.

9 Claims, 8 Drawing Sheets

ELECTROSTATIC CAPACITANCE DETECTION DEVICE

This nonprovisional application claims the benefit of Japanese Patent Application No. 2004-326767, filed Nov. 10, 2004. The entire disclosure of the prior applications is hereby incorporated by reference herein in its entirety.

BACKGROUND

The present invention relates to an electrostatic capacitance detection device that reads the surface shape of an object having microscopic irregularities such as fingerprints by detecting an electrostatic capacitance that varies in response to the distance to the surface of the object.

In the electrostatic capacitance detection device used for a fingerprint sensor or the like, a dielectric film is prepared on an electrostatic capacitance detection electrode, and fingerprints are detected utilizing the fact that there will be produced differences in the electrostatic capacitance between the ridges and valleys of the fingerprint when a finger touches thereupon. Japanese Unexamined Patent Publication No. 2003-254706 is an example of the related art, in which an electrostatic capacitance detection device with a circuit configuration is disclosed.

This electrostatic capacitance detection device of the conventional art includes: M individual power supply lines and N individual output lines arranged in a matrix form of M rows by N columns; and electrostatic capacitance detection elements prepared in these intersections, wherein the electrostatic capacitance detection element includes a signal detection element and a signal amplifying element; the signal detection element includes a capacitance detection electrode and a capacitance detection dielectric film; and wherein the signal amplifying element comprises an MIS thin film transistor used for signal amplification comprised of a gate electrode, a gate insulating film, and a semiconductor film.

However, in the above-described circuit configuration, there is a problem that signals from a plurality of electrostatic capacitance detection elements may be mixed in some cases, thereby reducing the detection accuracy. This will be described hereinafter.

Figure 9:
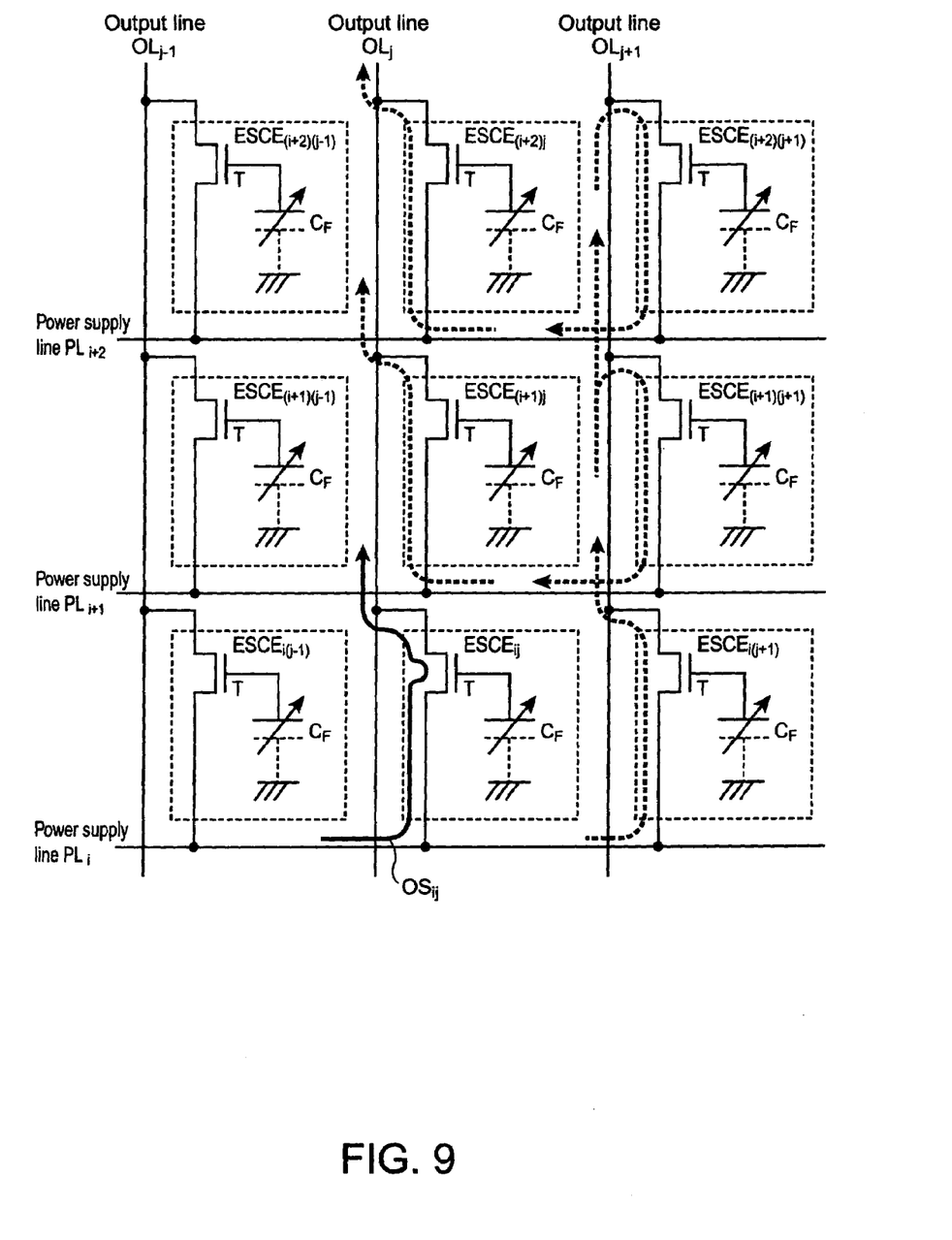
FIG. 9 is a view explaining the problem in the conventional electrostatic capacitance detection devices.

FIG. 9 shows a circuit diagram of the electrostatic capacitance detection device shown in the above-described patent. FIG. 9 shows a case where a voltage $\Delta V$ is applied to between a power supply line $PL_i$ and an output line $OL_j$, thereby taking out a signal $OS_{ij}$ from an electrostatic capacitance detection element $ECSE_{ij}$ to the output line $OL_j$. The flow of the signal $OS_{ij}$ which is originally intended to be outputted is the current path A shown by the thick solid line from the power supply line $PL_i$ to the output line $OL_j$. However, in the state that the voltage $\Delta V$ is applied to between the power supply line $PL_i$ and the output line $OL_j$, there are a plurality of paths shown by the dotted lines in the view such as the current path B from an electrostatic capacitance detection element $ECSE_{i(j+1)}$ to $ECSE_{(i+1)(j+1)}$ to $ECSE_{(i+1)j}$, the current path C from an electrostatic capacitance detection element $ECSE_{i(j+1)}$ to $ECSE_{(i+2)(j+1)}$ to $ECSE_{(i+2)j}$, or the like in addition to the current path A. Because of the presence of such current paths, unless an adequate threshold can be set to the electrostatic capacitance detection element, the signals will be mixed and outputted to the output line $OL_j$ via the current paths B and C, thereby reducing the detection accuracy.

SUMMARY

An advantage of the invention is to provide an electrostatic capacitance detection device capable of carrying out the electrostatic capacitance detection with high detection accuracy even in the case where the output line is provided for each column.

According to an aspect of the invention, an electrostatic capacitance detection device includes: an electrostatic capacitance detection element arranged in a matrix form; a row line arranged in each row for selecting a relevant electrostatic capacitance detection element arranged in a relevant row; an output line arranged in each column for outputting a signal from the relevant electrostatic capacitance detection element arranged in a relevant column. Each electrostatic capacitance detection element is provided with a row selection element that controls the outputting of the signal of the relevant electrostatic capacitance detection element to the relevant output line based on a signal from the relevant row, and the signal from the relevant electrostatic capacitance detection element, which is caused to be in a selection state based on the signal from the relevant row line, is outputted to the output line arranged in the relevant electrostatic capacitance detection element.

According to another aspect of the invention, in an electrostatic capacitance detection device that reads the surface shape of a relevant object by detecting an electrostatic capacitance that varies in response to the distance to the object, the electrostatic capacitance detection device includes: electrostatic capacitance detection elements arranged in M rows by N columns; M row-lines for selecting one relevant electrostatic capacitance detection element; and N output-lines arranged in each column for outputting the signal from the relevant electrostatic capacitance detection element prepared for each column; wherein the relevant electrostatic capacitance detection element includes: a) a signal detection element that accumulates charges in response to the relevant electrostatic capacitance; b) a signal amplifying element which amplifies the signal corresponding to the charges which the relevant signal detection element accumulates; c) a row selection element for causing the relevant electrostatic capacitance detection element to be in a selection state based on the signal from the relevant row line. The relevant signal detection element includes a capacitance detection electrode. The relevant signal amplifying element has a source electrode, a drain electrode, and a gate electrode. The relevant row selection element has a source electrode, a drain electrode, and a gate electrode. The gate electrode of the relevant signal amplifying element is coupled to the capacitance detection electrode. The gate electrode of the relevant row selection element is coupled to the relevant row line. The source electrode and drain electrode of the relevant signal amplifying element, and the source electrode and drain electrode of the relevant row selection element are coupled in series between the relevant output line and the relevant row line.

In the case where the signal of the electrostatic capacitance detection element is designed to be outputted to the output line, the signal from the element adjacent to the selected electrostatic capacitance detection element may leak out to the output line regardless of being or not being in the selection state. In such a case, not only the signal from the selected electrostatic capacitance detection element but also the signal from the adjacent electrostatic capacitance detection element will be mixed into the output line. According to the above-described configuration, the output line is arranged for each column, however, since the selection of each electrostatic capacitance detection element is made via the row selection element, the current path from the electrostatic capacitance detection element is blocked unless being selected. For this reason, it is possible to suppress that the signal current from the adjacent electrostatic capacitance detection element flows into the relevant output line.

It is preferable that the source electrode of the signal amplifying element be coupled to the row line; the drain electrode of the signal amplifying element be coupled to the source electrode of the row selection element; and the drain electrode of the row selection element be coupled to the output line.

It is further preferable that the electrostatic capacitance detection element include a reset element; the reset element be provided with a source electrode, a drain electrode, and a gate electrode; the source electrode of the reset element be coupled to the row line; the drain electrode of the reset element, the gate electrode of the signal amplifying element, and the capacitance detection electrode be coupled to each other; and the gate electrode of the reset element be coupled to the row line arranged in the adjacent row. According to the above-described configuration, the reset element is configured as to be capable of short-circuiting between the row line and the capacitance detection electrode in a timely manner, and therefore, for example, the charges accumulated in the capacitance detection electrode can be discharged just before the measurements, thereby allowing for the accurate electrostatic capacitance detection.

According to another aspect of the invention, in an electrostatic capacitance detection device that reads the surface shape of a relevant object by detecting an electrostatic capacitance that varies in response to the distance to the object; the electrostatic capacitance detection device includes: electrostatic capacitance detection elements arranged in M rows by N columns; M row-lines for selecting one relevant electrostatic capacitance detection element; and N output-lines arranged in each column for outputting the signal from the relevant electrostatic capacitance detection element prepared for each column. The relevant electrostatic capacitance detection element includes: a) a signal detection element that accumulates charges in response to the relevant electrostatic capacitance; b) a signal amplifying element which amplifies the signal corresponding to the charges which the relevant signal detection element accumulates; c) a row selection element for causing a relevant electrostatic capacitance detection element to be in a selection state based on the signal from the relevant row line. The relevant signal detection element includes a capacitance detection electrode and a reference capacitor. The relevant signal amplifying element has a source electrode, a drain electrode, and a gate electrode. The relevant row selection element has a source electrode, a drain electrode, and a gate electrode. The gate electrode of the relevant signal amplifying element, the relevant capacitance detection electrode, and one electrode of the relevant reference capacitor are coupled to each other. The gate electrode of the relevant row selection element is coupled to the relevant row line. The other electrode of the relevant reference capacitor is coupled to the relevant row line. The source electrode and drain electrode of the relevant signal amplifying element, and the source electrode and drain electrode of the relevant row selection element are coupled in series between the output line and the row line arranged in the adjacent row.

According to the above-described configuration, the above-described mixing of current from the adjacent electrostatic capacitance detection element can be prevented, and also the accurate electrostatic capacitance detection can be made because there is provided the reference capacitor that absorbs the variations of the capacitance of the signal amplifying element coupled to the signal detection element, the variations of the capacitance occurring in the manufacturing process or the like.

It is preferable that the source electrode of the signal amplifying element be coupled to the row line arranged in the adjacent row; the drain electrode of the signal amplifying element be coupled to the source electrode of the row selection element; and the drain electrode of the row selection element be coupled to the output line.

It is preferable that the electrostatic capacitance detection element include a reset element; the reset element be provided with a source electrode, a drain electrode, and a gate electrode; the source electrode of the reset element be coupled to the row line; the drain electrode of the reset element, the gate electrode of the signal amplifying element, the capacitance detection electrode, and one electrode of the reference capacitor be coupled to each other; and the gate electrode of the reset element be coupled to the row line arranged in the adjacent row. According to the above-described configuration, the reset element is configured as to be capable of short-circuiting between the row line and the capacitance detection electrode in a timely manner, and therefore, for example, the charges accumulated in the capacitance detection electrode can be discharged just before the measurements, and thus the accurate electrostatic capacitance detection can be made.

It is preferable that the row selection element be coupled to the output line side, and the signal amplifying element be coupled to the row line side. Since all the row selection elements caused to be in a non-selection state are in the OFF state, the load capacitance concerning the electrostatic capacitance detection element of each output line will be only the drain capacitance of the row selection element. On the other hand, in the case where the signal amplifying element is coupled to the output line, since the signal amplifying element is not the one functioning as the switching element, it will not be completely in the OFF state, and thus even the gate capacitance of the signal amplifying element is added as the load capacitance of the output line. Accordingly, it is possible to reduce the load capacitance by coupling so that the row selection element is arranged at the output line side.

According to another aspect of the invention, an electronic apparatus comprises the electrostatic capacitance detection device described above. Since the electrostatic capacitance detection device of the invention is suitable for sensor devices which detect microscopic shapes of a human body, such as fingerprints as the differences in the electrostatic capacitance, it can be applied to various electronic apparatus which require authentication or the like. For example, it can be applied to a smart card and a cellular phone provided with an individual authentication function, and to authentication devices to be installed in the entrance of a security zone that authenticates based on a part of the shape of a human body, such as fingerprints.

BRIEF DESCRIPTION OF THE DRAWINGS

The invention will be described with reference to the accompanying drawings, wherein like numbers refer to like elements, and wherein.

DETAILED DESCRIPTION OF EMBODIMENTS

Next, preferred embodiments of the invention will be described with reference to the accompanying drawings.

The embodiments of the invention are examples in which an electrostatic capacitance detection device, which reads the surface shape of an object by detecting an electrostatic capacitance that varies in response to the distance to the object, is applied to a fingerprint sensor for detecting fingerprints. In the following embodiments, the "object" is thus a finger, and the surface shape to be detected is the fingerprint.

(Principle of Operation)

In accordance with FIG. 1, the principle of the operation of the electrostatic capacitance detection device in the invention will be described.

Figure 1:
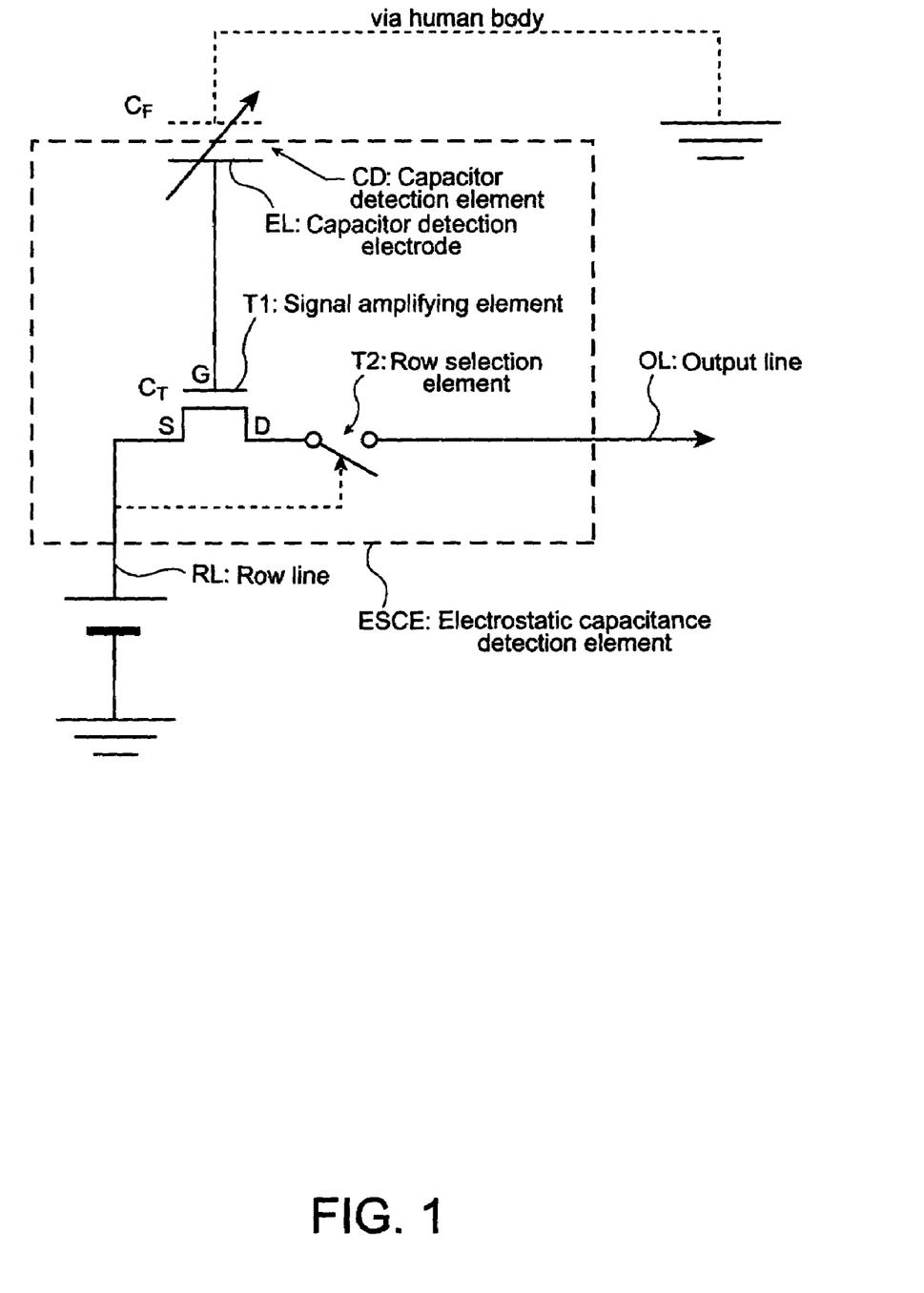
FIG. 1 is an equivalent circuit diagram for explaining the principle of the invention.

FIG. 1 shows an equivalent circuit concerning one of the electrostatic capacitance detection elements ESCE arranged in a matrix form in the electrostatic capacitance detection device of the invention. A row line RL is arranged in each line as to select the electrostatic capacitance detection element arranged in each row. An output line OL is arranged in each column to output the signal from the electrostatic capacitance detection element ESCE arranged in each column. Each electrostatic capacitance detection element ESCE is provided with a row selection element T2 which controls the outputting of the signal of the relevant electrostatic capacitance detection element ESCE to a relevant output line based on the signal from the row line RL.

According to this configuration, the signal from the relevant electrostatic capacitance detection element ESCE is allowed to be outputted, based on the selection signal from the relevant row line RL, by the row selection element T2 only when it is caused to be in a selection state, and therefore, in the adjacent electrostatic capacitance detection element, the signal from the electrostatic capacitance detection element will not be outputted to the output line unless the row line is in the selection state. For this reason, the signal current from the adjacent electrostatic capacitance detection element is blocked, and only the signal from the electrostatic capacitance detection element ESCE of the selected line will be outputted to one output line.

Moreover, as another aspect of the electrostatic capacitance detection device of this embodiment is that the detection signal from the capacitance detection element CD is amplified with a signal amplifying element T1.

In the equivalent circuit of FIG. 1, a capacitance detection electrode EL of the capacitance detection element CD serves as an electrostatic capacitance $C_F$ when a fingerprint or the like touches thereupon. The signal amplifying element T1 amplifies a detection voltage $V_G$ corresponding to the charge Q induced into this capacitance detection element CD. The signal amplifying element T1 is comprised of a gate electrode G, a gate insulating film and a semiconductor film, and has a source electrode S, a drain electrode D, and a gate electrode G. The gate electrode G of the signal amplifying element T1 and the capacitance detection electrode EL are coupled to each other.

In addition, the source electrode and the drain electrode of the semiconductor device will not be discriminated from each other in the specification, however, for convenience, one electrode will be named the source electrode and the other one will be named the drain electrode. To be physically precise, for the source electrode and drain electrode of a transistor, the one having a lower potential is defined as the source electrode in case of an N-type transistor, and the one having a higher potential is defined as the source electrode in case of a P-type transistor. However, which electrode has a higher potential varies according to the operation conditions. Therefore, strictly speaking, the source electrode and drain electrode are always interchangeable in one transistor. In this specification, such preciseness will be excluded in order to clarify the description, and for convenience, one electrode will be called the source electrode, and the other will be called the drain electrode.

In the above-described configuration, when an object, such as a fingerprint touches upon or approaches to the capacitance detection electrode EL, the potential $V_G$ will be generated in the capacitance detection electrode EL in response to the electrostatic capacitance $C_F$ relative to the object. This potential $V_G$ will be the voltage to be induced between the capacitor of the capacitance detection element CD having the electrostatic capacitance $C_F$ which varies in response to the surface shape (the fingerprint) of the object, and a transistor capacitance $C_T$ of the signal amplifying element T1. This potential $V_G$ is inputted to the gate electrode G of the signal amplifying element T1, thereby varying the gate voltage. If a predetermined voltage is applied to the drain electrode D of this signal amplifying element T1, an current $I_{ds}$ flowing between the source and drain of the signal amplifying element T1 will be modulated greatly in response to the induced gate voltage $V_G$. Although the charge Q is generated corresponding to the potential $V_G$ in the gate electrode G or the like, such charges will be preserved without flowing anywhere, and thus the current value $I_{ds}$ will be kept constant. Accordingly, by increasing the drain voltage or increasing the measuring time, the measurements of the current $I_{ds}$ will be also made easily, and thus even when a thin film transistor is used as the signal amplifying element, the surface shape of the object can be measured sufficiently precisely. The signal (the current or voltage) made by amplifying the electrostatic capacitance information on the object is read via the output line. In order to measure the electrostatic capacitance of the object, the current $I_{ds}$ via the signal amplifying element T1 may be measured, or a voltage V varying in response to such current $I_{ds}$ may be measured.

The semiconductor device configuring such an electrostatic capacitance detection device may be manufactured using a thin film formation technique, or may be manufactured from a single crystal silicon substrate. In the case where the electrostatic capacitance detection device is formed on the single crystal silicon substrate, since the single crystal silicon substrate is formed consuming a considerable amount of energy, it will be expensive. On the other hand, in the case where the thin film formation technique is used, since the thin film transistor is usually formed on a glass substrate, a semiconductor integrated circuit requiring for a large area can be manufactured at low cost. That is, as compared with the case where the single crystal silicon substrate is used, the electrostatic capacitance detection device can be formed at lower cost without wasting the precious earth resources. Moreover, the thin film transistor can be formed on a plastic substrate applying a transfer technique. The electrostatic capacitance detection device is also formed possibly on the plastic substrate with the transfer technique.

On the other hand, in the thin film transistor formed with the thin film formation technique, there are disadvantages that the transistor characteristic is not as excellent as that of the semiconductor device formed in the single crystal silicon substrate, and that the characteristic deviation between the thin film transistor is also large, and therefore, even if the electrostatic capacitance detection device having a configuration, in which the output of the capacitance detection electrode is outputted as it is, is configured with the thin film transistor, sufficient characteristics will not be obtained. This is because the charge Q to be induced by contacting of fingerprints or the like is extremely small, so this small charge Q can not be read accurately with the thin film transistor having poor characteristics.

With regard to this point, according to the invention, the voltage $V_G$ corresponding to the small amount of charge Q is outputted as to be readable as the constant current value $I_{ds}$ due to the current-amplifying effect of the signal amplifying element. Accordingly, even if it is configured using the thin film transistor, the measurements accuracy can be increased sufficiently.

In addition, in the configuration of FIG. 1, a reference capacitor having an electrostatic capacitance $C_R$ may be prepared in the gate electrode of the signal amplifying element T1. In this case, the potential $V_G$ will be a voltage induced between the capacitor of the capacitance detection element CD having the electrostatic capacitance $C_F$ which varies in response to the surface shape (the fingerprint) of the object, and a composite capacitance $C_R+C_T$ of the electrostatic capacitance $C_R$ of the reference capacitor and the transistor capacitance $C_T$ of the signal amplifying element T1.

Hereinafter, embodiments 1 and 2 will be described as circuit examples in which the transistor capacitance of the signal amplifying element is used also as the reference capacitor in stead of providing the reference capacitor, and embodiments 3 and 4 will be described as examples in which the reference capacitor is provided.

First Embodiment

The first embodiment of the invention is a circuit example in the case where the electrostatic capacitance detection device provided with a row selection element and an output line concerning the invention is configured using the transistor capacitance of a signal amplifying element also as the reference capacitor.

Figure 2:
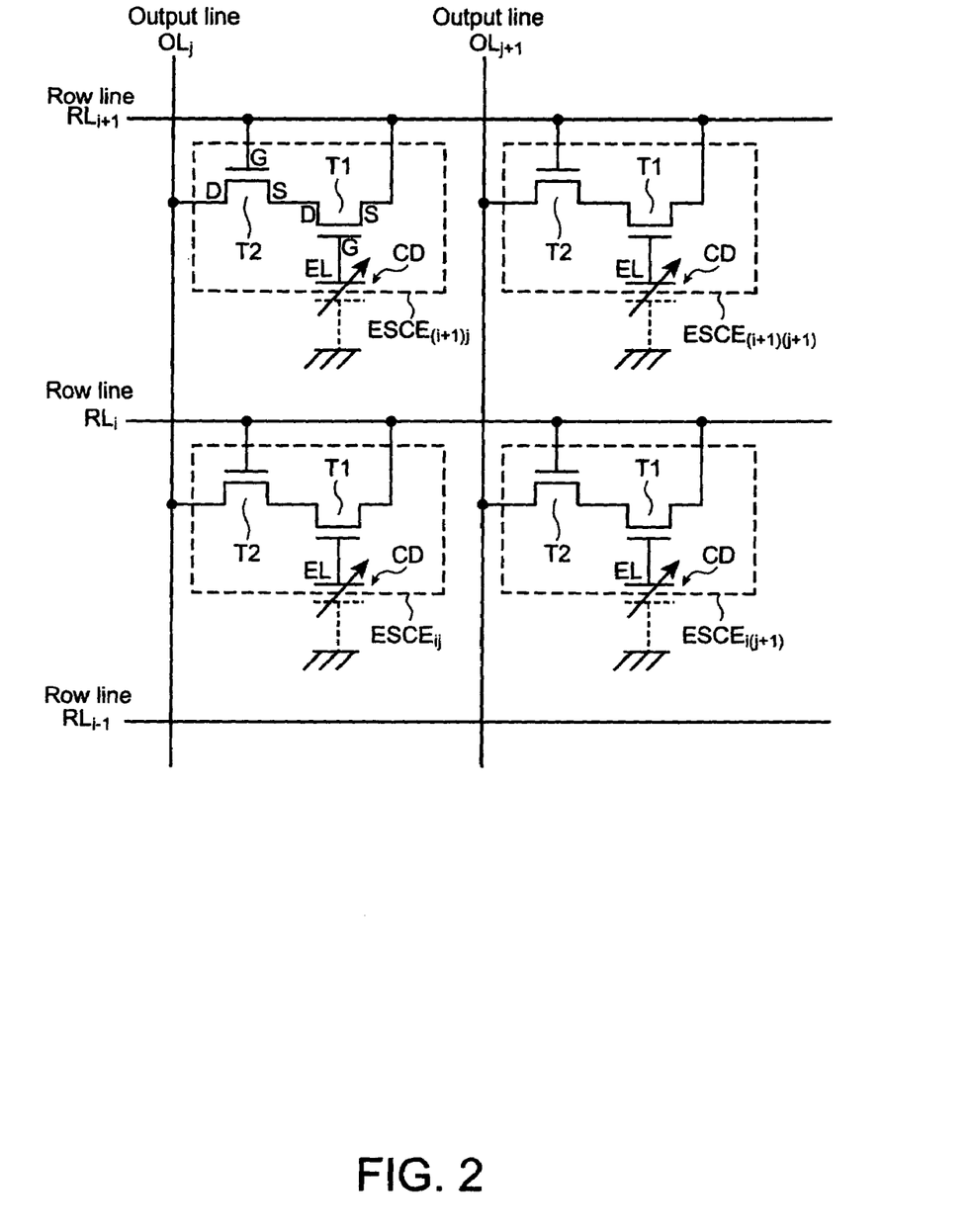
FIG. 2 is a circuit diagram of an electrostatic capacitance detection device in a first embodiment of the invention.

FIG. 2 shows a circuit diagram of this first embodiment. As shown in FIG. 2, the relevant electrostatic capacitance detection device is provided with an electrostatic capacitance detection element $ESCE_{ij}$ ($1 \leq i \leq M$, $1 \leq j \leq N$) arranged in M rows by N columns; M row-lines $RL_i$ for selecting one of the electrostatic capacitance detection elements ESCE; and N output-lines $OL_j$ arranged in each column for outputting the signal from the relevant electrostatic capacitance detection element ESCE provided in each column. FIG. 2 exemplifies, among them, four adjacent electrostatic capacitance detection elements $ESCE_{ij}$ to $ESCE_{(i+1)(j+1)}$ coupled to the row lines $RL_{i-1}$ to $RL_{i+1}$ and the output lines $OL_j$ to $OL_{j+1}$. Hereinafter, unless otherwise stated, the electrostatic capacitance detection element $ESCE_{ij}$ coupled to the row line $RL_i$ and output line $OL_j$ will be described as the representative thereof.

The electrostatic capacitance detection element $ESCE_{ij}$ includes: the capacitance detection element CD which accumulates charges in response to the electrostatic capacitance; the signal amplifying element T1 for amplifying the signal corresponding to the charges that the capacitance detection element CD accumulates; the row selection element T2 for causing the electrostatic capacitance detection element $ESCE_{ij}$ to be in a selection state based on the signal from the row line $RL_i$. The capacitance detection element CD includes the capacitance detection electrode EL. The signal amplifying element T1 has the source electrode S, drain electrode D, and gate electrode G. The row selection element T2 has the source electrode S, drain electrode D, and gate electrode G. The gate electrode G of the signal amplifying element T1 is coupled to the capacitance detection electrode EL. The gate electrode G of the row selection element T2 is coupled to the row line $RL_i$. The source electrode S and drain electrode D of the signal amplifying element T1, and the source electrode S and drain electrode D of the row selection element T2 are coupled in series between the row line $RL_i$ and the output line $OL_j$.

In the relevant electrostatic capacitance detection device, since all the transistors including the signal amplifying element T1 and the row selection element T2 are configured from an N-type transistor, a high potential Vdd is applied to the row line $RL_i$ of the row i caused to be in the selection state, and a low potential Vss is applied to the row line RL of the other lines caused to be in a non-selection state. Since the row selection element T2 in the row line in the non-selection state will be in the OFF state, there will be only an current path via the electrostatic capacitance detection element $ESCE_{ij}$ between the row line $RL_i$ and the output line $OL_j$, and thus the current via the other row lines will not flow into the output line $OL_j$, and thus the detection accuracy can be improved.

Figure 7:
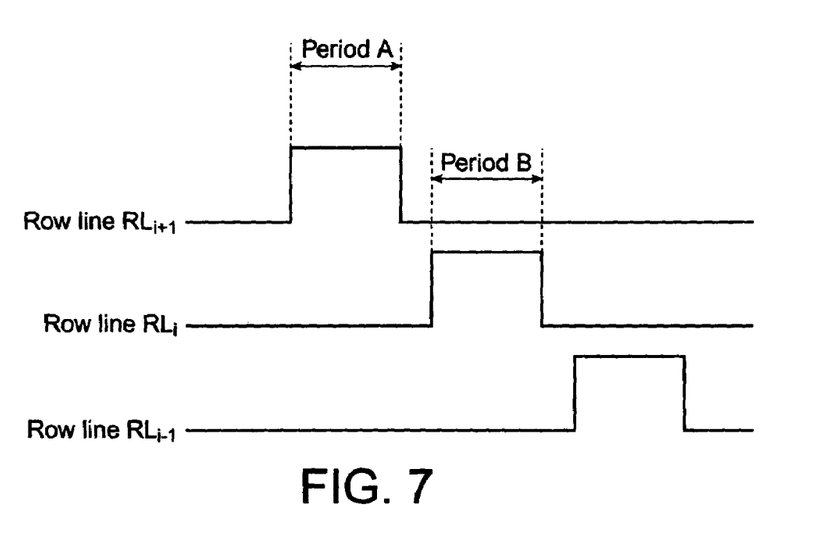
FIG. 7 is an example of a waveform of a selection signal applied to a row line in the embodiment.

FIG. 7 shows waveforms of the selection signal applied to each row line. As shown in FIG. 7, it is possible to select the row sequentially by applying the selection signal that causes sequentially only one row to be in the selection state. The period for causing to be in the selection state is set to a period in which the current appearing in the output line OL is settled to be sufficiently readable.

In the circuit shown in FIG. 2, since the source electrode S of the signal amplifying element T1 is coupled to the row line $RL_i$, the high potential Vdd is applied to the source electrode S of the signal amplifying element T1 when it is in the selection state and the signal is read out. This is because a voltage needs to be applied to between the capacitor comprised of the gate-capacitance $C_T$ of the signal amplifying element T1 and the object to thereby induce the potential $V_G$, since this circuit does not include the reference capacitor.

In this respect, as shown in FIG. 2, in order to reduce the load capacitance of the output line OL, it is preferable that the drain electrode D of the row selection element T2 be coupled to the output line OL. The followings are the reasons. Since all the row selection elements T2 caused to be in the non-selection state will be in the OFF state, the load capacitance regarding the electrostatic capacitance detection element ESCE of each output line OL will be only the drain capacitance of the row selection element T2. On the other hand, when the signal amplifying element T1 is coupled to the output line OL, since the signal amplifying element T1 is not the one functioning as a switching element, it will not be completely in the OFF state, and thus even the gate capacitance of the signal amplifying element T1 may be added as the load capacitance of the output line OL.

According to the above-described configuration, since the row selection element T2 of the row line in the non-selection state will be in the OFF state, there will be only the current path via the electrostatic capacitance detection element $ESCE_{ij}$ between the row line $RL_i$ caused to be in the selection state and the output line $OL_j$, and thus the current via other row lines will not flow into the output line $OL_j$. Namely, since the current paths from the electrostatic capacitance detection elements coupled to rows other than the row of the selected electrostatic capacitance detection element will be blocked, it is possible to suppress that the signal current from these adjacent electrostatic capacitance detection elements flows into the relevant output line OL.

Second Embodiment

An second embodiment of the invention is a circuit example in the case where a reset element is further added to the electrostatic capacitance detection device of the above-described first embodiment.

Figure 3:
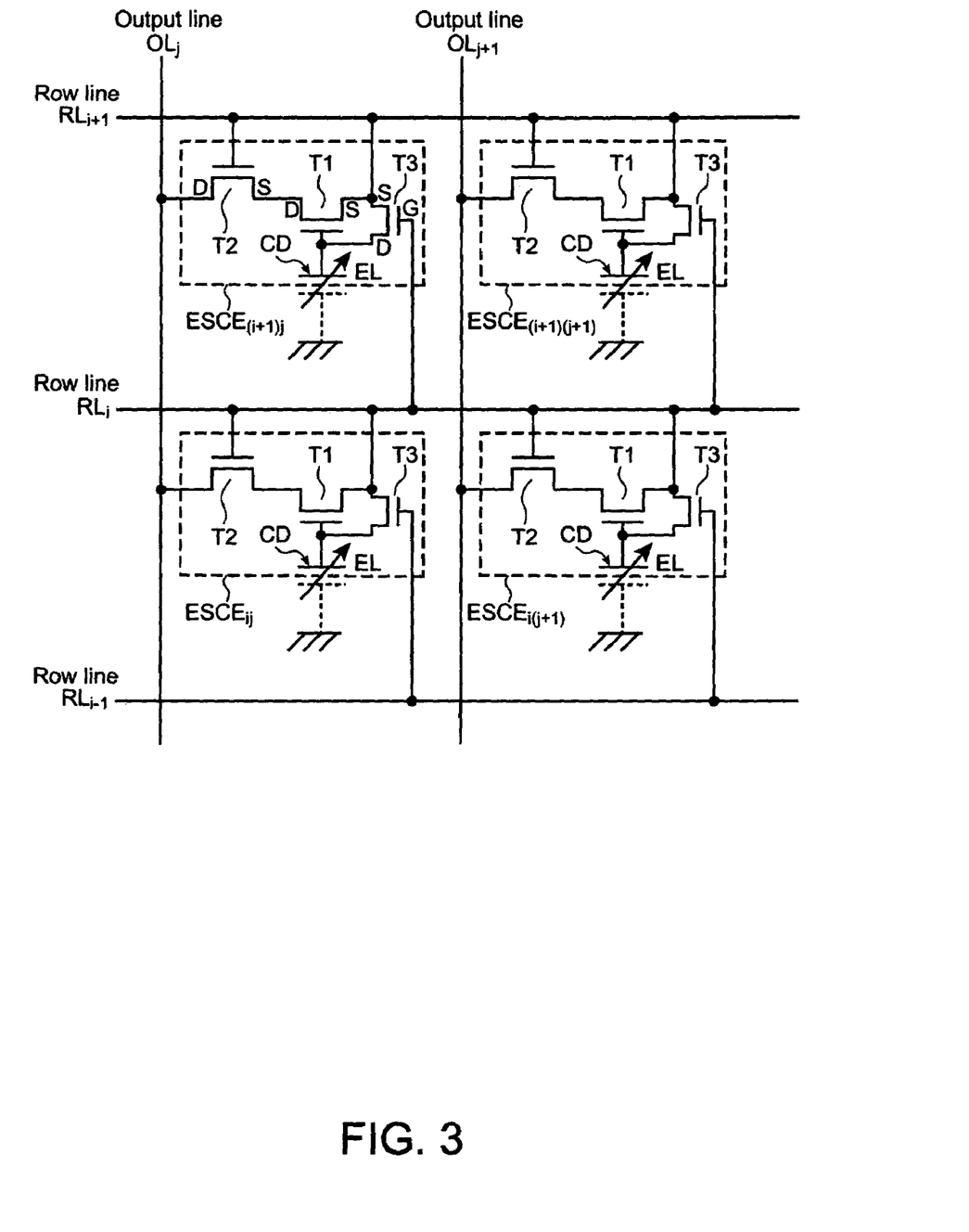
FIG. 3 is a circuit diagram of an electrostatic capacitance detection device in a second embodiment of the invention.

FIG. 3 shows a circuit diagram of this second embodiment. As shown in FIG. 3, the electrostatic capacitance detection element ESCE of the relevant electrostatic capacitance detection device further includes a reset element T3 in the circuit configuration similar to that of the first embodiment. The reset element T3 is provided with the source electrode S, drain electrode D, and gate electrode G. The source electrode S of the reset element T3 is coupled to the row line $RL_i$. The drain electrode D of the reset element T3, the gate electrode G of the signal amplifying element T1, and the capacitance detection electrode EL are coupled to each other. The gate electrode G of the reset element T3 is coupled to the row line $RL_{i-1}$ arranged in the adjacent row.

It is preferable that the removal of charges by means of this reset element T3 be carried out just before measuring the electrostatic capacitance if possible. Accordingly, the gate electrode G which is a control terminal of the reset element T3 should be coupled to the row line of the adjacent row which will be in the selection state just before the measurements. For example, when the selection signal as shown in FIG. 7 is applied to the row line, the gate electrode G of the reset element T3 of the electrostatic capacitance detection element $ESCE_{ij}$ to be arranged in the i-th row is coupled to a row line $RL_{i-1}$ of the (i−1)-th row. The source electrode S of the reset element T3 is coupled to the row line $RL_i$ of the i-th row, and the drain electrode D is coupled to the capacitance detection electrode EL and the gate electrode G of the signal amplifying element T1, whereby the charges of the capacitance detection element CD of the relevant electrostatic capacitance detection element $ESCE_{ij}$ will be reset during the selection period (a period A) of the (i−1)-th row. Accordingly, the capacitance detection electrode EL, in which the charges are accumulated, and the row line $RL_i$, which is in a low-impedance state, are caused to be in a short circuit state just before the measurements, and the charges accumulated in the capacitance detection element CD and the gate electrode G of the signal amplifying element T1 will be removed. Subsequently, the row line $RL_i$ will be in the selection state when entering into the selection period (a period B) of the i-th row, so the reset element T3 is caused to be in the OFF state, and the row selection element T2 is caused to be in the ON state instead, thereby outputting the signal to the output line $OL_j$.

As described above, according to the configuration of this second embodiment, since the reset element T3 is configured as to be capable of short-circuiting between the row line RL and the capacitance detection electrode EL, the charges accumulated in the capacitance detection electrode can be discharged, for example, just before the measurements, and thus the accurate electrostatic capacitance detection can be made.

Third Embodiment

An third embodiment of the invention is a circuit example in the case where the electrostatic capacitance detection device provided with the row selection element and the output line concerning the invention is configured using a reference capacitor.

Figure 4:
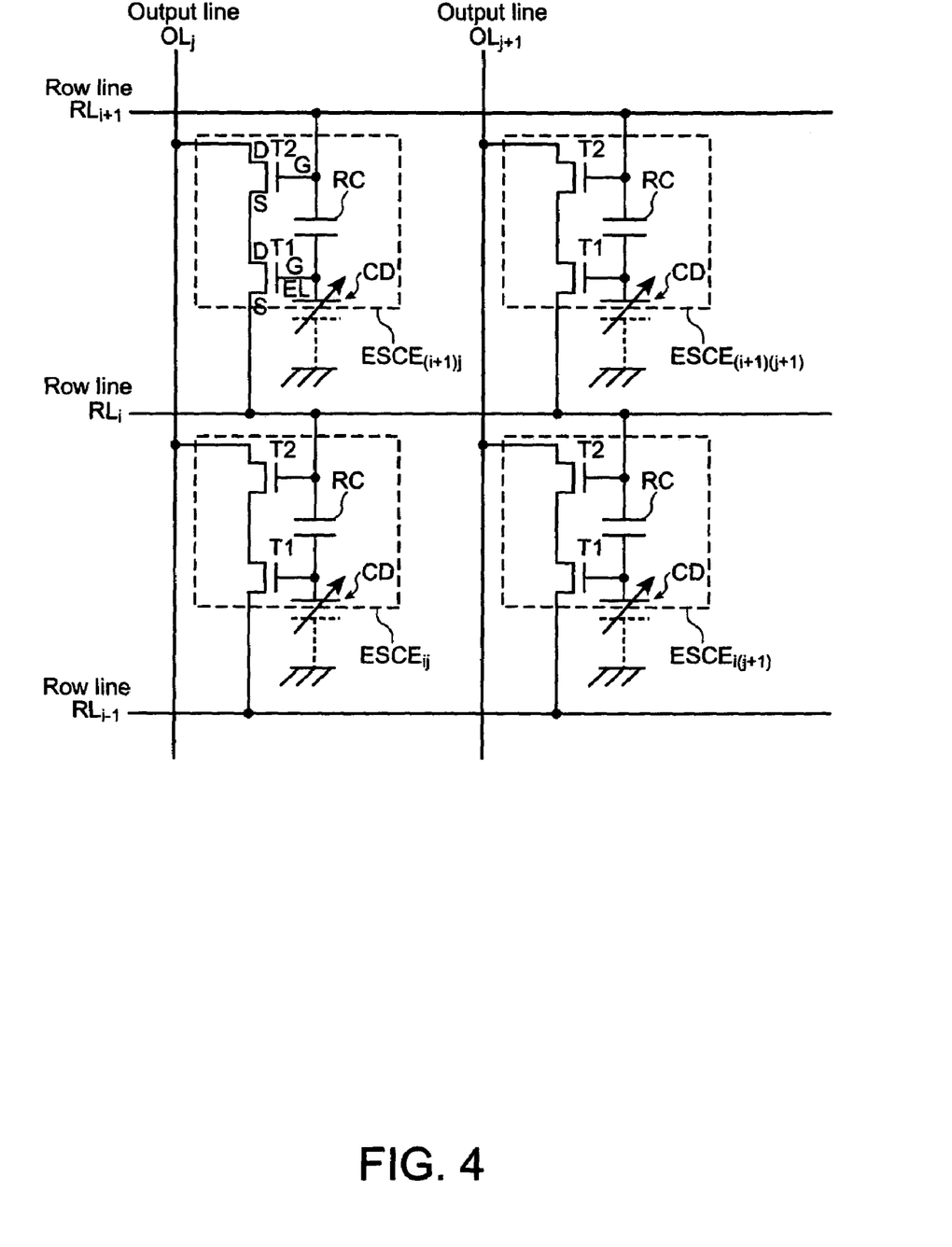
FIG. 4 is a circuit diagram of an electrostatic capacitance detection device in a third embodiment of the invention.

FIG. 4 shows a circuit diagram of this third embodiment. As shown in FIG. 4, the relevant electrostatic capacitance detection device is provided with the electrostatic capacitance detection element $ESCE_{ij}$ ($1 \leq i \leq M$, $1 \leq j \leq N$) arranged in M rows by N columns; M row-lines $RL_i$ for selecting one of the electrostatic capacitance detection elements ESCE; and N output-lines $OL_j$ arranged in each column for outputting the signal from the relevant electrostatic capacitance detection element ESCE prepared in each column. FIG. 4 exemplifies, among them, four adjacent electrostatic capacitance detection elements $ESCE_{ij}$ to $ESCE_{(i+1)(j+1)}$ coupled to the row lines $RL_{i-1}$ to $RL_{i+1}$ and the output lines $OL_j$ to $OL_{j+1}$. Hereinafter, unless otherwise specified, the electrostatic capacitance detection element $ESCE_{ij}$ coupled to the row line $RL_i$ and the output line $OL_j$ will be described as the representative thereof.

The electrostatic capacitance detection element $ESCE_{ij}$ includes: the capacitance detection element CD which accumulates charges in response to the electrostatic capacitance; the signal amplifying element T1 for amplifying the signal corresponding to the charges that the capacitance detection element CD accumulates; the row selection element T2 for causing the electrostatic capacitance detection element $ESCE_{ij}$ to be in the selection state based on the signal from the row line $RL_i$. Up to now, the configuration is the same as that of the first embodiment.

The capacitance detection element CD includes the capacitance detection electrode EL and a reference capacitor RC. The signal amplifying element T1 has the source electrode S, drain electrode, and gate electrode G. The row selection element T2 has the source electrode S, drain electrode D, and gate electrode G. The gate electrode G of the signal amplifying element T1, the capacitance detection electrode EL, and one electrode (a first electrode) of the reference capacitor RC are coupled to each other. The gate electrode G of the row selection element T2 is coupled to the row line $RL_i$. The other electrode (a second electrode) of the reference capacitor RC is coupled to the row line $RL_i$. The source electrode S and drain electrode D of the signal amplifying element T1, and the source electrode S and drain electrode D of the row selection element T2 are coupled in series between the relevant output line $OL_j$ and the row line $RL_{i-1}$ arranged in the adjacent row.

The reference capacitor RC is included in this third embodiment. In the case where the reference capacitor RC is included, a voltage is applied to between one electrode (the first electrode) of the reference capacitor RC and the object (for example, a finger), thereby inducing the potential $V_G$ to the gate electrode G of the signal amplifying element T1. Assuming the surface of the object is at the ground potential (=the low potential Vss), the voltage $V_G$ will vary from Vdd to Vss. Assuming the transistor of the signal amplifying element T1 is an N type, it is preferable that the source-gate voltage of the signal amplifying element T1 vary as positive potentials. Accordingly, the source electrode S of the signal amplifying element T1 is coupled to the row line $RL_{i-1}$ of the adjacent row, and during the measurements period, i.e., at the time of reading the signal, the low potential Vss is applied.

In the above-described configuration, the reference capacitor RC exists. Since the signal current $I_{ds}$ which is the output of the signal amplifying element T1 is associated with the gate voltage $V_G$, if the reference capacitor does not exist, this gate voltage $V_G$ will be distributed between the transistor capacitance (the gate capacitance) of the signal amplifying element T1 and the capacitance in the capacitance detection element CD. However, usually in the thin film transistors, the variations in the manufacturing process exists, therefore, the voltage $V_G$ to be detected for each electrostatic capacitance detection element ESCE may vary largely. That is, in the case where the reference capacitor does not exist, even if the electrostatic capacitance of the object is detected simultaneously under the same conditions, the variations for each element will occur in the voltage $V_G$ to be detected, because there are the variations in the transistor capacitance for each electrostatic capacitance detection element ESCE. As a result, it is likely that the shape of the object cannot be measured accurately.

In this respect, if the reference capacitor RC is coupled to the gate electrode G of the signal amplifying element T1 like this embodiment, the voltage $V_G$ to be detected will be distributed across the electrostatic capacitance $C_F$ of the object, and a composite capacitance $C_G+C_R$ of the transistor capacitance of the signal amplifying element T1 and the electrostatic capacitance $C_R$ of the reference capacitor RC. If the electrostatic capacitance $C_R$ of this reference capacitor RC is set to be sufficiently large as compared with the transistor capacitance $C_G$, it is possible to make smaller the influence from the variations of the transistor capacitance caused substantially by the variations in the manufacturing of the thin film transistors. Therefore, according to this third embodiment, since the reference capacitor RC is included, it is possible to increase the detection accuracy by absorbing the variations in the manufacturing of the thin film transistors.

Fourth Embodiment

An fourth embodiment of the invention is a circuit example in the case where a reset element is further added to the electrostatic capacitance detection device of the third embodiment described above.

Figure 5:
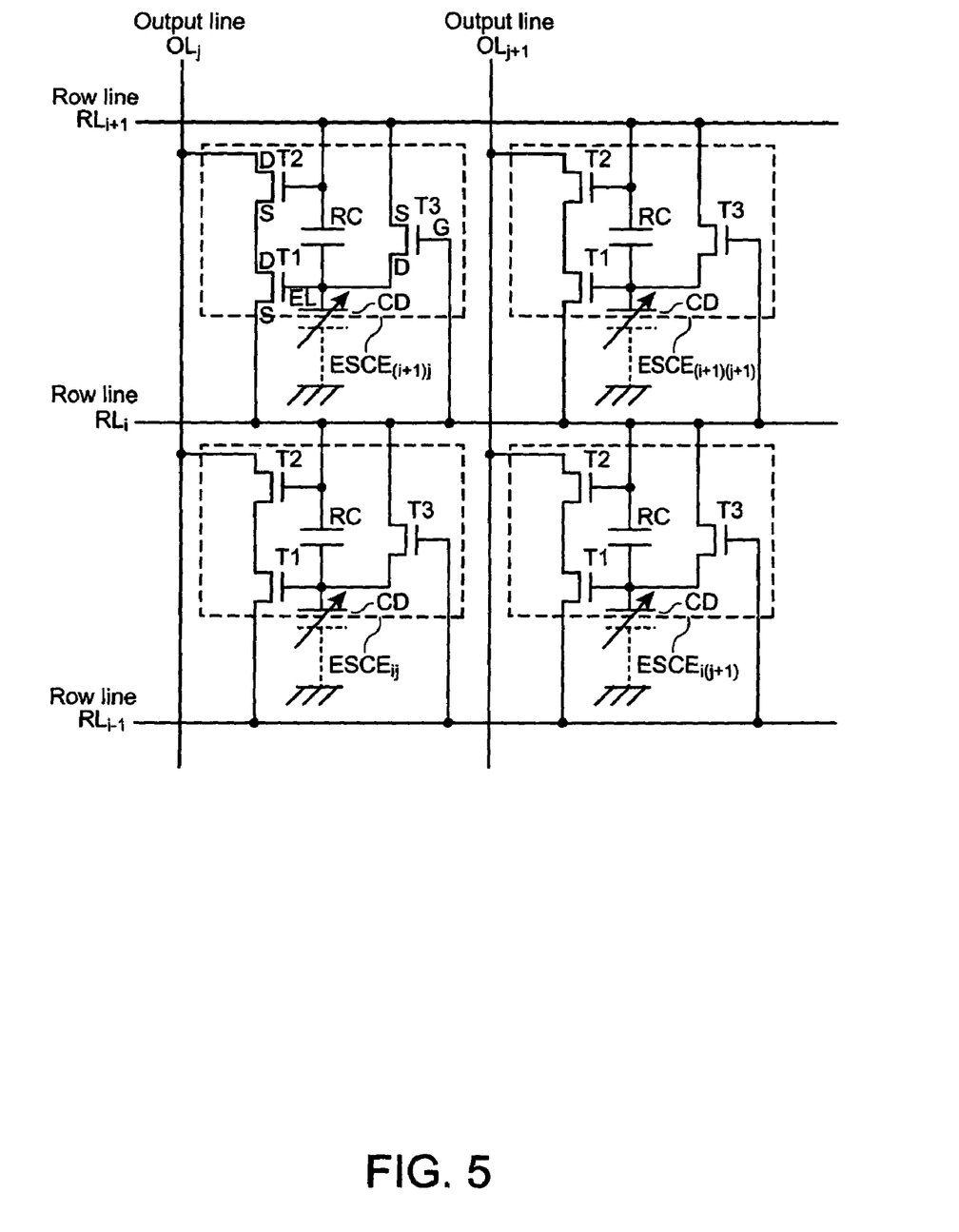
FIG. 5 is a circuit diagram of an electrostatic capacitance detection device in a fourth embodiment of the invention.

FIG. 5 shows a circuit diagram of this fourth embodiment. As shown in FIG. 5, the electrostatic capacitance detection element ESCE of the relevant electrostatic capacitance detection device further includes a reset element T3 in the circuit configuration similar to the first embodiment. The reset element T3 is provided with the source electrode S, drain electrode D, and gate electrode G. The source electrode S of the reset element T3 is coupled to the row line $RL_i$. The drain electrode D of the reset element T3, the gate electrode G of the signal amplifying element T1, and the capacitance detection electrode EL are coupled to each other. The gate electrode G of the reset element T3 is coupled to the row line $RL_{i-1}$ arranged in the adjacent row.

It is preferable that the removal of charges by means of this reset element T3 be carried out just before measuring the electrostatic capacitance if possible. Accordingly, the gate electrode G which is the control terminal of the reset element T3 should be coupled to the row line of the adjacent row which becomes in the selection state just before the measurements. For example, when the selection signal as shown in FIG. 7 is applied to the row line, the gate electrode G of the reset element T3 of the electrostatic capacitance detection element $ESCE_{ij}$ to be arranged in the i-th row is coupled to the row line $RL_{i-1}$ of the (i–1)-th line. The source electrode S of the reset element T3 is coupled to the row line $RL_i$ of the i-th row, and the drain electrode D is coupled to the capacitance detection electrode EL and the gate electrode G of the signal amplifying element T1, whereby the charges of the capacitance detection element CD of the relevant electrostatic capacitance detection element $ESCE_{ij}$ will be reset during the selection period (the period A) of the (i–1)-th row. Accordingly, the capacitance detection electrode EL in which the charges are accumulated, and the row line $RL_i$ in a low-impedance state are caused to be in the short-circuit state just before the measurements, and thus the charges accumulated in the capacitance detection element CD and the gate electrode G of the signal amplifying element T1 will be removed. Subsequently, when entering the selection period (the period B) of the i-th row, the row line $RL_i$ will be in the selection state, so the reset element T3 is caused to be in the OFF state, and the row selection element T2 is caused to be in the ON state instead, thereby outputting the signal to the output line $OL_j$.

As described above, according to the configuration of this fourth embodiment, since the reset element T3 is configured as to be capable of short-circuiting between the row line RL and the capacitance detection electrode EL, the charges accumulated in the capacitance detection electrode can be discharged, for example, just before the measurements, thereby allowing for the accurate electrostatic capacitance detection.

Fifth Embodiment

An fifth embodiment of the invention is a circuit example in which a common output line is prepared in the output line in the electrostatic capacitance detection device of the first embodiment described above.

Figure 6:
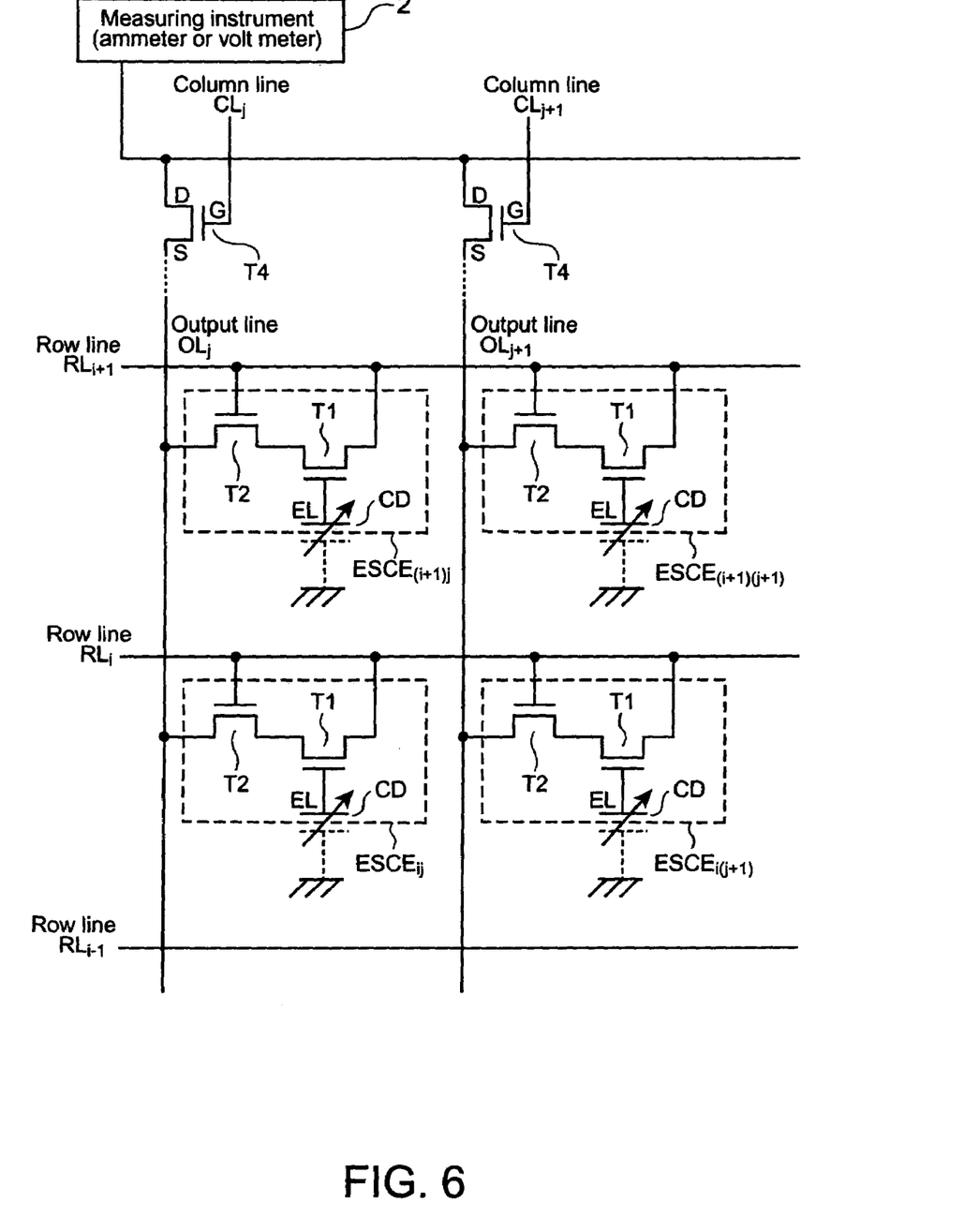
FIG. 6 is a circuit diagram of an electrostatic capacitance detection device in a fifth embodiment of the invention.

FIG. 6 shows a circuit diagram of this fifth embodiment. As shown in FIG. 6, although the electrostatic capacitance detection element ESCE of the relevant electrostatic capacitance detection device is provided with a circuit similar to that of the first embodiment, a pass gate element T4 is prepared at the end of each output line OL in this embodiment. This pass gate element T4 is comprised of, for example, a thin film transistor, and is provided with the source electrode S, drain electrode D, and gate electrode G. The source electrode S and drain electrode D of the pass gate element T4 are inserted in between a measuring instrument 2 and the output line OL, and the gate electrode G is coupled to a column line $CL_j$ ($1 \leq j \leq N$), respectively. The signal from each pass gate element T4 is coupled to the common line and coupled to the measuring instrument 2. The measuring instrument 2 is an ammeter or a voltmeter.

In the above-described configuration, when the column line $CL_j$ becomes in the selection state, the signal current of the output line OLj corresponding to the column line CLj will flow to the measuring instrument 2 via the pass gate element T4. In the invention, since the signal current will flow to the output line OL for each column, the signal outputted from the corresponding electrostatic capacitance detection element ESCE is outputted to each output line OL by causing one of the row lines RL to be in the selection state. Therefore, it is necessary to prepare the measuring instrument of the current or voltage for each output line OL. However, if there is any variation in the measurement performance among these plurality of measuring instruments, there will be produced variations in the value itself to be measured. Therefore, it is preferable an identical measuring instrument be used in common if possible. Moreover, the fewer the number of the measuring instruments, the lower the cost.

With this respect, according to this fifth embodiment, by making the selection signal applied to the column line CL, for example, to be the waveform which becomes in the selection state sequentially like the selection signal (refer to FIG. 7) in the row line RL, it is possible to make the signal current inputted to the measuring instrument 2 to be only the one from one output line OL when one column line CL is in the selection state, and thus it is possible to measure the signal current from all the output lines OL with one measuring instrument 2. Therefore, according to the configuration of this fifth embodiment, since the signal current from all the output lines OL can be measured with one measuring instrument, it is possible to make insignificant the influence from the variations produced in the measuring instrument, and thus the cost reduction can be attained by making the number of measuring instruments to be only one.

Sixth Embodiment

An sixth embodiment of the invention is an exemplification of an electronic apparatus provided with the electrostatic capacitance detection device of the invention.

Figure 8:
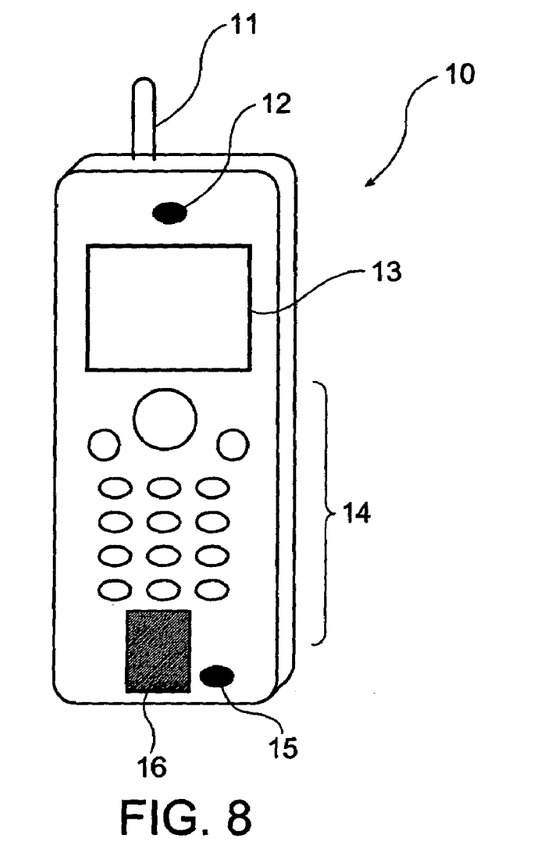
FIG. 8 is an embodiment (a cellular phone) of an electronic apparatus using the electrostatic capacitance detection device of the invention.

FIG. 8 shows a schematic view of a cellular phone as an example of the electronic apparatus provided with the electrostatic capacitance detection device of the invention. A cellular phone 10 shown in FIG. 8 is provided with an antenna 11, a loudspeaker 12, a display 13, an operation button 14, a microphone 15, and an electrostatic capacitance detection device 16 of the invention.

The cellular phone 10 is configured so that the electrostatic capacitance detection device 16 may function as a fingerprint sensor for the user. In the initial state of the cellular phone 10, the cellular phone 10 causes the electrostatic capacitance detection device 16 to detect the fingerprint of the owner of the relevant cellular phone 10, and to register the user with an internal memory as the on/off information of the pixels. In use thereafter, when an operation requiring for a specific security is conducted, the cellular phone 10 first displays on the display 13 a message that a fingerprint verification is required, thereby urging the user to conduct the fingerprint verification. When the electrostatic capacitance detection device 16 reads the user's fingerprint, the cellular phone 10 will conduct the fingerprint verification by verifying with the owner's fingerprint registered in the initial stage with the use of a predetermined verification method. As the result, if it is judged that the newly detected fingerprint is in agreement with the owner's fingerprint, the operation requiring for the designated predetermined security will be made in the authorized state. The operation contents requiring for such security include, for example, the cases of accessing charging sites, eliminating data, or displaying high privacy information. In the electrostatic capacitance detection device of this embodiment, the thin film transistor is used, and thus it is extremely thin, and has high durability and high detection-accuracy, therefore, it is suitable for the compact electronic apparatus like cellular phones.

The electrostatic capacitance detection device of this embodiment can be applied to devices requiring for the judgment of the shape of an object, such as a human body, and for example, applied to a smart card and a cellular phone provided with an individual authentication function, and to authentication devices to be installed in the entrance of a security zone that authenticates based on a part of the shape of a human body, such as fingerprints.

What is claimed is:

1. An electrostatic capacitance detection device, comprising:
   an electrostatic capacitance detection element arranged in a matrix form;
   a row line arranged in each row for selecting a relevant electrostatic capacitance detection element arranged in a relevant row; and
   an output line arranged in each column for outputting a signal from a relevant electrostatic capacitance detection element arranged in a relevant column, wherein the electrostatic capacitance detection element includes:
      a row selection element that controls the outputting of the signal of the relevant electrostatic capacitance detection element to the relevant output line based on the signal from the relevant row; and
      a signal amplifying element that amplifies the signal corresponding to charges in response to an electrostatic capacitance;
   the row selection element and the signal amplifying element have a source electrode and a drain electrode respectively, the source electrode and drain electrode of the relevant signal amplifying element, and the source electrode and drain electrode of the relevent row selection element are coupled in series between the relevant output line and the relevant row line; and
   the signal form the relevant electrostatic capacitance detection element, which is caused to be in a selection state based on the signal from the relevant row line, is outputted to the output line arranged in the relevant electrostatic capacitance detection element.

2. In combination, an electronic apparatus comprising the electrostatic capacitance detection device according to claim 1, wherein the electrostatic capacitance detection device being incorporated as a functional part of the electronic apparatus.

3. An electrostatic capacitance detection device that reads the surface shape of a relevant object by detecting an electrostatic capacitance that varies in response to the distance to the relevant object; the electrostatic capacitance detection device comprising:
   electrostatic capacitance detection elements arranged in M rows by N columns;
   M row-lines for selecting one relevant electrostatic capacitance detection element; and
   N output-lines arranged in each column for outputting a signal from the relevant electrostatic capacitance detection element prepared for each column; wherein
   the relevant electrostatic capacitance detection element includes:
   a) a signal detection element that accumulates charges in response to the relevant electrostatic capacitance;
   b) a signal amplifying element that amplifies the signal corresponding to the charges that the relevant signal detection element accumulates; and c) a row selection element for causing the relevant electrostatic capacitance detection element to be in a selection state based on the signal from the relevant row line, wherein the relevant signal detection element includes a capacitance detection electrode;

the relevant signal amplifying element has a source electrode, a drain electrode, and a gate electrode; and the relevant row selection element has a source electrode, a drain electrode, and a gate electrode; wherein the gate electrode of the relevant signal amplifying element is coupled to the capacitance detection electrode;

the gate electrode of the relevant row selection element is coupled to the relevant row line; and the source electrode and drain electrode of the relevant signal amplifying element, and the source electrode and drain electrode of the relevant row selection element are coupled in series between the relevant output line and the relevant row line.

4. The electrostatic capacitance detection device according to claim 3, wherein the electrostatic capacitance detection element includes a reset element; and the reset element is provided with a source electrode, a drain electrode, and a gate electrode; wherein the source electrode of the reset element is coupled to the row line;

the drain electrode of the reset element, the gate electrode of the signal amplifying element, and the capacitance detection electrode are coupled to each other; and the gate electrode of the reset element is coupled to the row line arranged in the adjacent row.

5. The electrostatic capacitance detection device according to claim 3, wherein the source electrode of the signal amplifying element is coupled to the row line;

the drain electrode of the signal amplifying element is coupled to the source electrode of the row selection element; and the drain electrode of the row selection element is coupled to the output line.

6. The electrostatic capacitance detection device according to claim 3, wherein the row selection element is coupled to the output line side, and the signal amplifying element is coupled to the row line side.

7. An electrostatic capacitance detection device that reads the surface shape of an object by detecting an electrostatic capacitance that varies in response to the distance to the object; the electrostatic capacitance detection device comprising:

electrostatic capacitance detection elements arranged in M rows by N columns;

M row-lines for selecting one relevant electrostatic capacitance detection element; and N output-lines arranged in each column for outputting a signal from the relevant electrostatic capacitance detection element prepared for each column, wherein the relevant electrostatic capacitance detection element includes:

a) a signal detection element that accumulates charges in response to the relevant electrostatic capacitance;

b) a signal amplifying element that amplifies the signal corresponding to the charges that the relevant signal detection element accumulates; and c) a row selection element for causing the relevant electrostatic capacitance detection element to be in a selection state based on the signal from the relevant row line, wherein the relevant signal detection element includes a capacitance detection electrode and a reference capacitor;

the relevant signal amplifying element has a source electrode, a drain electrode, and a gate electrode, and the relevant row selection element has a source electrode, a drain electrode, and a gate electrode; wherein the gate electrode of the relevant signal amplifying element, the relevant capacitance detection electrode, and one electrode of the relevant reference capacitor are coupled to each other;

the gate electrode of the relevant row selection element is coupled to the relevant row line;

the other electrode of the relevant reference capacitor is coupled to the relevant row line; and the source electrode and drain electrode of the relevant signal amplifying element, and the source electrode and drain electrode of the relevant row selection element are coupled in series between the relevant output line and the row line arranged in the adjacent row.

8. The electrostatic capacitance detection device according to claim 7, wherein the source electrode of the signal amplifying element is coupled to the row line arranged in the adjacent row;

the drain electrode of the signal amplifying element is coupled to the source electrode of the row selection element; and the drain electrode of the row selection element is coupled to the output line.

9. The electrostatic capacitance detection device according to claim 7, wherein the electrostatic capacitance detection element includes a reset element; and the reset element is provided with a source electrode, a drain electrode, and a gate electrode; wherein the source electrode of the reset element is coupled to the row line;

the drain electrode of the reset element, the gate electrode of the signal amplifying element, the capacitance detection electrode, and one electrode of the reference capacitor are coupled to each other; and the gate electrode of the reset element is coupled to the row line arranged in the adjacent row.

* * * * *